United States Patent [19]
Solano et al.

[11] Patent Number: 5,265,493
[45] Date of Patent: Nov. 30, 1993

[54] LENGTH REGULATING DEVICE FOR SECURITY CABLE OF MOTOR VEHICLES

[75] Inventors: Victorino Solano, Sant Sugat Del Valles; Agustin Roca, Rubi, both of Spain

[73] Assignee: Pujol T. Tarrago S.A., Rubi, Spain

[21] Appl. No.: 778,868

[22] PCT Filed: Mar. 20, 1991

[86] PCT No.: PCT/EG91/00016
§ 371 Date: Feb. 10, 1992
§ 102(e) Date: Feb. 10, 1992

[87] PCT Pub. No.: WO86/05849
PCT Pub. Date: Oct. 9, 1986

[30] Foreign Application Priority Data

Apr. 23, 1990 [ES] Spain ............................ P 9001138

[51] Int. Cl.⁵ ................................................ F16C 1/10
[52] U.S. Cl. ............................. 74/501.5 R; 74/500.5; 74/502.4; 74/502.6; 192/111 A
[58] Field of Search ............ 74/500.5, 501.5 R, 501.6, 74/502, 502.6, 503, 504; 192/111 A X

[56] References Cited

U.S. PATENT DOCUMENTS

| 4,735,298 | 4/1988 | Haugel | 192/111 A |
| 4,751,851 | 6/1988 | Deligny et al. | 74/501.5 R |
| 4,756,397 | 7/1988 | Deligny | 74/501.5 R |
| 4,762,017 | 8/1988 | Jaksic | 74/501 R |
| 4,787,263 | 11/1988 | Jaksic | 74/502.4 X |
| 4,799,400 | 1/1989 | Pickell | 74/502.6 X |
| 4,838,109 | 6/1989 | Stewart | 74/501.5 R |
| 4,887,705 | 12/1989 | Soland et al. | 974/501.5 R |
| 5,086,662 | 2/1992 | Tayon et al. | 192/111 A |

FOREIGN PATENT DOCUMENTS

| 0030494 | 6/1981 | European Pat. Off. | 192/111 A |
| 2621090 | 3/1989 | France | 192/111 A |
| 8605849 | 10/1986 | PCT Int'l Appl. | 192/111 A |

Primary Examiner—Vinh T. Luong
Attorney, Agent, or Firm—Michael J. Striker

[57] ABSTRACT

An automobile parking brake cable length self-adjusting device has an adjusting mechanism which is operative for setting and adjusting a length of a sheathed cable which connects an actuating mechanism of one of a brake shoe or caliper actuating mechanism, and a control mechanism which is permanently connected by the sheathed cable to the adjusting mechanism to cooperate with the latter and commands setting and adjusting operations of the adjusting mechanism depending on the position of the brake lever.

14 Claims, 4 Drawing Sheets

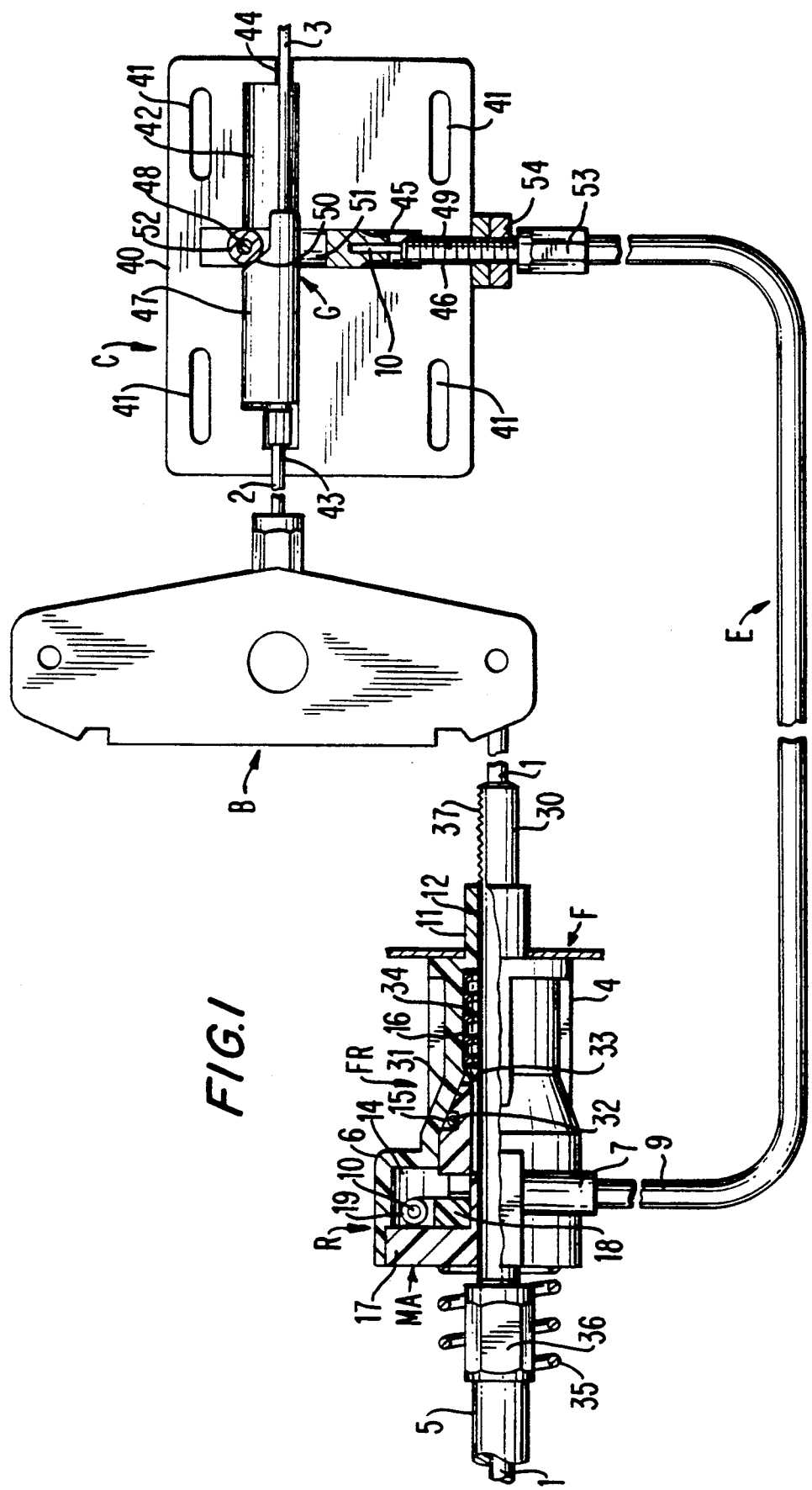

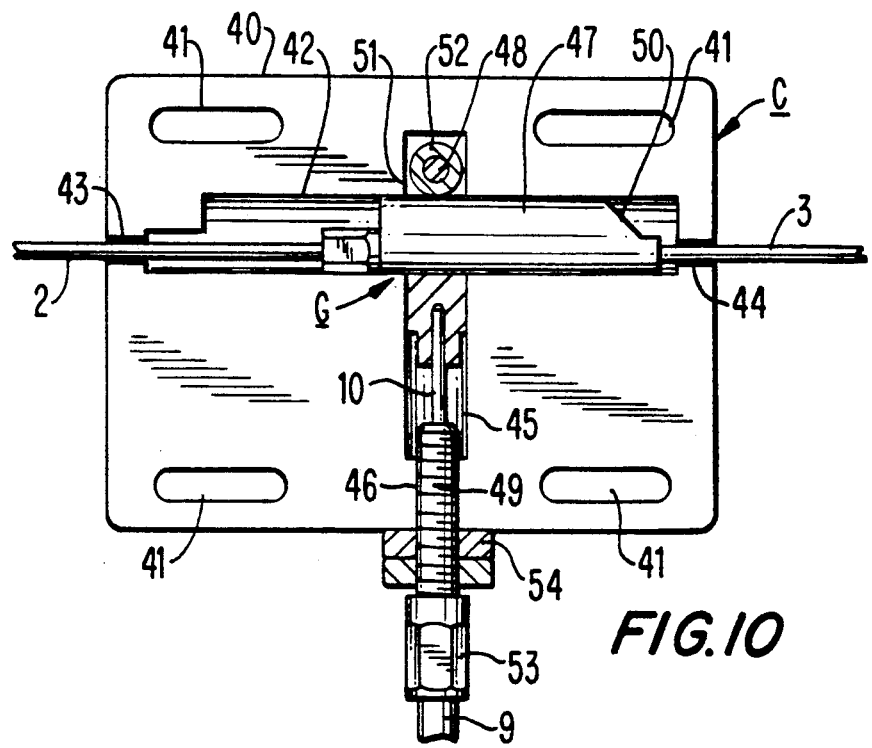
FIG.10
FIG.6  FIG.7
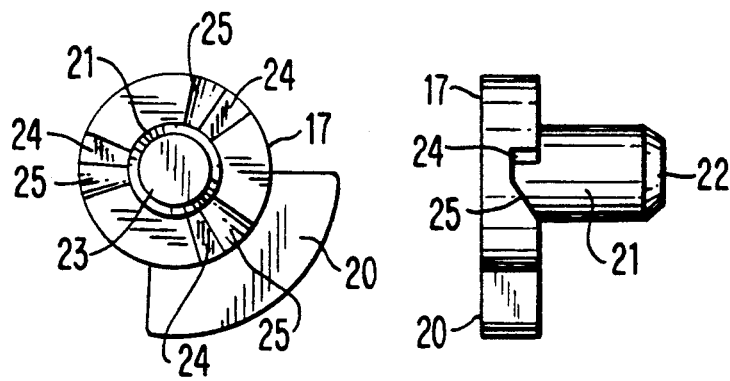
FIG.8  FIG.9
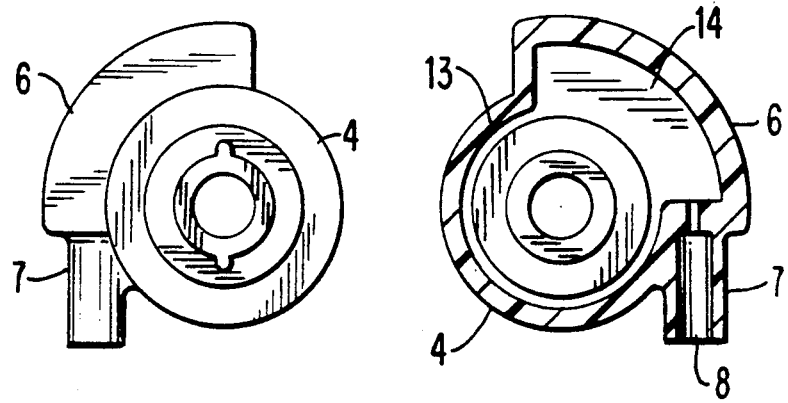

LENGTH REGULATING DEVICE FOR SECURITY CABLE OF MOTOR VEHICLES

BACKGROUND OF THE INVENTION

The present invention relates to a device for self-adjusting or regulating the length of an automobile parking brake cable, in particular for private passenger cars and transport vehicles.

As is known, the purpose of the parking brake incorporated as original equipment in automobiles is to hold the vehicle immobile once it has been parked, even when it is parked on a steep slope. The parking brake generally acts on the rear wheels of the automobile and, in any case, the parking brake mechanical actuating device is independent of the service or foot brake actuating device.

The parking brake is generally actuated manually by a brake lever which is disposed in the vehicle and connected by sheathed steel cables to the mechanisms applying the brake shoes or calipers which immobilize the vehicle on each rear wheel. The said brake lever is provided with mechanical means setting the position in which the parking brake is operative, preventing the said brake lever from accidentally coming out of the braking position under normal service conditions.

The said sheathed steel cables connecting the brake lever to the brake shoe or caliper actuating mechanism of each rear wheel are subject to variations of length. This causes unequal operation of the brake device which is compensated by mechanisms acting permanently on the sheathed steel cables.

The known parking brake sheathed steel cable length compensation mechanisms suffer, nevertheless, from notable operative drawbacks when the brake shoes or calipers are temporarily seized, i.e., when the brake shoes or calipers do not return to the normal released position until some time has passed after releasing the brake lever. This situation is frequently caused by accumulation of ice on the brake shoe or caliper actuating mechanisms during extended parking of the vehicle in the open air, in regions where low temperatures are usual.

SUMMARY OF THE INVENTION

To provide a solution to the problems caused by temporary seizure of the automobile parking brake shoes or calipers under the above conditions, a parking brake cable length self-adjusting device of a new structure is disclosed.

The device of the invention is characterized in that it has an adjusting mechanism which is suitably disposed relative to the sheathed steel cable connecting the brake shoe or caliper actuating mechanism of one of the vehicle rear wheels to the brake lever and which sets and adjusts the length of sheathed cable comprised between said the mechanisms; and a control mechanism which is suitably disposed relative to the steel cable connecting the brake shoe or caliper actuating mechanisms of the rear wheels with the parking bake lever and is permanently connected by a sheathed steel cable to the adjusting mechanism with which it acts coordinatedly. In this way the control mechanism commands the setting and adjusting operations of the said adjusting mechanism, depending on the position of the brake lever.

The adjusting mechanism is formed by an essentially frustoconical hollow main body member of sufficient size to receive mechanical actuating means which are firmly connected to the control mechanism by way of the steel cable connecting the adjusting and control mechanisms, and mechanical means setting and adjusting the length of the sheathed steel cable located between the adjusting mechanism and the actuating mechanism of the brake shoes or caliper of the corresponding rear wheel.

The main body member of the adjusting mechanism is formed, at the end facing the rear wheel brake shoe or caliper actuating mechanism with a concentric radial extension provided with a tangential extension having a bore of stepped section. The bore is so dimensioned that the steel cable, devoid of sheath, linking the adjusting and control mechanisms may suitably slide therethrough, and so that it can receive and firmly fix the corresponding end of the sheath of said steel cable. At the other end it has a longitudinal extension which is dimensioned and shaped to allow the attachment of the adjusting mechanism to a fixed point of the vehicle structure. The interior of the main body member is formed, at the end facing the said actuating mechanism, with a cylindrical portion connected to a transverse cavity concentric therewith which is coextensive with the said concentric radial extension. The said cylindrical portion and transverse cavity ar dimensioned snugly to receive mechanical actuating means. As an extension to the said cylindrical portion and correlatively therewith, there is a frustoconical portion and a cylindrical portion so dimensioned as snugly to receive mechanical fixing and adjusting means.

The mechanical actuating means is constituted by an essentially cylindrical base member having a concentric radial extension which dimensionally allows the coupling and snug closing, lidwise, of the corresponding end of the main body member. The base member is formed on the side, interior to the main body member, with a sufficient number of suitably dimensioned radial slots and with a longitudinal centered extension the free end of which is essentially frustoconical. The said base member is provided with a centered longitudinal bore so dimensioned that the members constituting the mechanical fixing and adjusting means may slide suitably therethrough. The mechanical actuating means also comprises an essentially cylindrical thrust disc provided with a longitudinal through bore through which the longitudinal extension formed on the said base member may suitably slide. The surface of the thrust disc facing the base member is provided with radial ribs which agree in number and size with the radial slots formed on the base member so that they may snugly engage and disengage. The thrust disc is provided with retaining projections allowing firm attachment thereof with the steel cable connecting the adjusting and control mechanisms. The mechanical actuating means also comprises a spring housed in the transverse cavity formed inside the main body member and permanently bearing against the thrust disc and against the corresponding wall of the said cavity so that when the spring is expanded it establishes the position in which the thrust disc and the base member are closest together.

The mechanical fixing and adjusting means is constituted by an adjusting rod which is firmly attached at one end thereof to the sheath of the steel cable whose length is to be adjusted. Said adjusting rod has a longitudinal through bore suitably designed so that the steel cable devoid of sheath may slide therethrough, and an external retaining thread extending over a sufficient length. There are also clamping jaws of suitable size and sufficient number provided with corresponding retaining threads mating with the thread formed on the outside of the adjusting rod. The means also comprises an essentially conical releasing member provided with a bore through which the adjusting rod may slide and a spring disposed coaxially with the adjusting rod and pressing permanently against the main body member and the release member.

The mechanical fixing and adjusting means is provided with a spring disposed coaxially about the sheath of the steel cable whose length is to be adjusted. It bears permanently against the main body member of the adjusting mechanism and against the sheath of the said steel cable, whereby it may adjust the length of the sheathed steel cable.

The control mechanism is constituted by an essentially right parallelepipedic main body member suitably dimensioned so as to sungly receive mechanical command means determining the actuation of the said adjusting mechanism. The mechanical command means is connected, as described above, to the thrust disc forming the actuating means of the adjusting mechanism by way of a sheathed steel cable.

The control mechanism main body member comprises means which is suitably dimensioned depending on each particular application and allows it to be anchored to a fixed point of the vehicle structure. It is formed internally with a longitudinal through cavity and a transverse cavity which are suitably dimensioned and so disposed mutually as to allow constituent parts of the command mechanism to slide snugly therethrough while acting coordinatedly. Said transverse cavity is provided with a through hole which may comprise a retaining screw thread for receiving and fixing constituent parts of the said command mechanism.

The command mechanism is constituted by a thrust member which is received in the said longitudinal through cavity and firmly attached to the steel cable which, as said above, connects the brake lever with the vehicle rear wheel brake shoe or caliper actuating mechanisms. It also comprises a draw member which is housed in the said transverse cavity and is firmly attached to the other end of the steel cable connecting it to the thrust disc of the adjusting mechanism. Said draw member is formed with a through hole through which the said thrust member may slide so as to cause a longitudinal movement of the draw member over a sufficient distance. It further comprises an adjusting rod which may be formed on the outside thereof with a retaining screw thread and which is firmly attached at one end thereof to the sheath of the cable connecting the adjusting and control mechanisms. It is provided with a longitudinal through hole so that the steel cable, devoid of sheath, connected to the draw member may suitably slide therethrough, allowing for adjustment and setting of the length of the sheathed cable comprised between the control and adjusting mechanisms.

BRIEF DESCRIPTION OF THE DRAWINGS

The automobile parking brake cable length self-adjusting device of the invention is represented in the sheets of drawings of the present specification. In said drawings:

FIG. 1 is an overall partially sectioned view of the device of the invention.

FIGS. 6 and 7 are side and top views respectively of a component of the adjusting mechanism of the device of the invention.

FIG. 8 is a bottom view of a component of the adjusting mechanism of the device of the invention.

FIG. 9 is a cross section view from FIG. 8.

FIG. 10 is a top view, partly in section, of the control mechanism of the device of the invention.

DETAILED DESCRIPTION OF THE EMBODIMENT

Figure 2A:
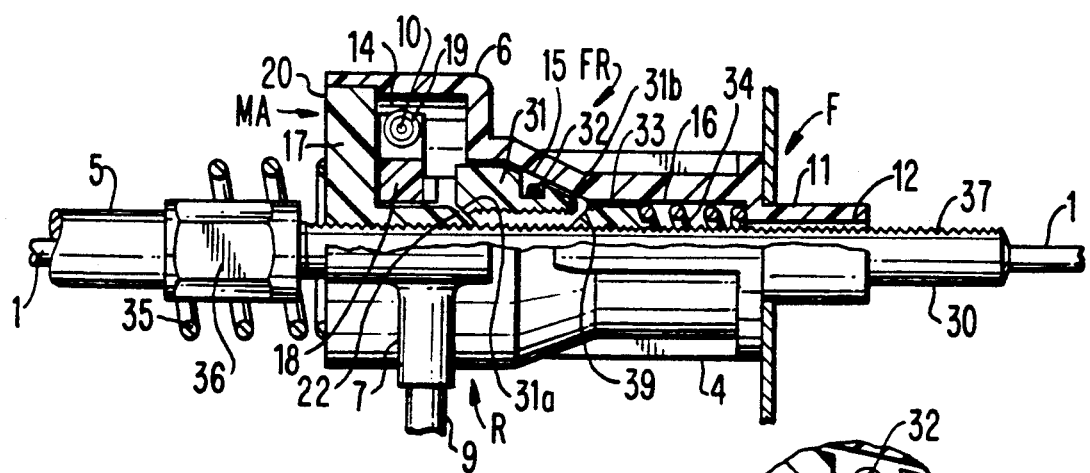
FIGS. 2A and 3A are views partly in section of the adjusting mechanism forming the device of the invention in different operative stages.

The automobile parking brake cable length self-adjusting device described as an embodiment is formed, as shown in FIG. 1 of the enclosed drawing sheets, by the adjusting mechanism and by the control mechanism C connected together by the sheathed steel cable E.

The adjusting mechanism R is mounted on the steel cable 1 connecting the brake shoe or caliper actuating mechanism M of one of the rear wheels RH of the vehicle with the rocking device B, which is connected to the control mechanism by the steel cable 2. In turn, the control mechanism C is connected to the brake lever F1 by the steel cable 3, all as shown in detail in FIG. 1 which, for clarity, does not show the said actuating mechanism or the brake lever.

The adjusting mechanism R is formed by the main body member 4 suitably dimensioned snugly to receive mechanical actuating means MA and fixing and adjusting means FR for the length of the steel cable 1 provided with the sheath 5. The steel cable 1 extends between the adjusting mechanism and the said brake shoe or caliper actuating mechanism.

Figure 2B:
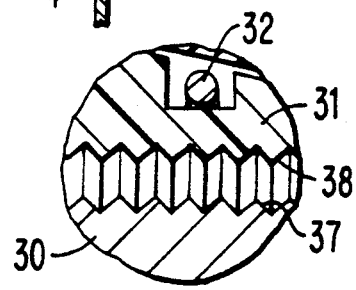
FIGS. 2B and 3B are enlarged views of fragments of FIGS. 2A and 3A.
Figure 3A:
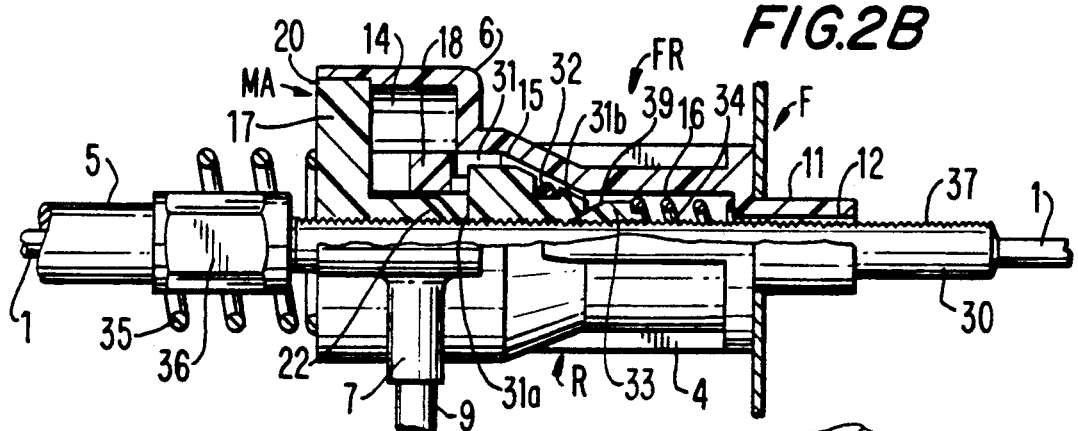
Figure 3B:
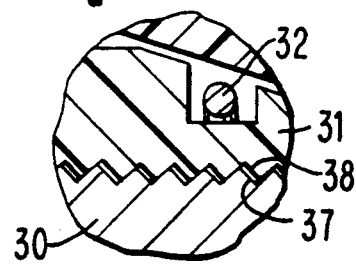

The main body member 4 is essentially frustoconical as shown in FIGS. 1, 2 and 3 and is made preferably from plastics materials of appropriate mechanical properties.

The main body member 4 is formed at the end facing the sheathed steel cable 1-5, with the concentric radial extension 6 provided with the tangential extension 7, shown in FIGS. 1, 2, 3, 8 and 9. The said tangential extension 7 is provided with a bore 8, shown in FIG. 9, of stepped section which is designed to receive and fix the corresponding end of the sheath 9 of the steel cable 10. The cable 10 connects the adjusting mechanism R and control mechanism C, and allows passage therethrough of said steel cable 10. At the opposite end there is the longitudinal extension 11 provided with a bore 12, shown in FIGS. 1, 2 and 3 and designed to anchor the adjusting mechanism R to the fixed point F of the vehicle structure.

In this embodiment, the longitudinal extension 11 is cylindrical and, logically, may have any other form which is appropiate for each particular application.

The interior of the main body member 4 is formed, at the said end facing to the sheathed steel cable 1-5, with a cylindrical portion 13 having a transverse cavity 14 concentric therewith and coextensive with the radial extension 6 as shown in detail in FIG. 9. It is designed snugly to receive the mechanical actuating means MA. Linking with the said cylindrical portion 13 and transfer cavity 14 and correlatively therewith, the interior of the main body member 4 is formed with a frustoconical portion 15 and a cylindrical portion 16 designed snugly for receiving mechanical fixing and adjusting means FR.

The mechanical actuating means MA is constituted by the base member 17, by the thrust disc 18 and by the spring 19 which are mutually engageable as shown in FIGS. 1, 2 and 3. The base member 17 and the thrust disc 18 are preferably made from plastics materials of appropriate mechanical properties.

The base member 17 as shown i FIGS. 1, 2 and 3. It acts as a cover for the main body member 4, as shown i FIGS. 1, 2 and 3. It is essentially cylindrical and is formed with a concentric radial extension 20 and a longitudinal centered extension 21 the free end of which is frustoconical in 22 as shown in FIGS. 6 and 7. Said base member 17 has a longitudinal central bore 23.

FIGS. 6 and 7 show also how the surface of the base member 17 facing the interior of the main body member 4 is formed in this embodiment with three radial slots 24 having corresponding sliding planes 25.

Figures 4, 5:
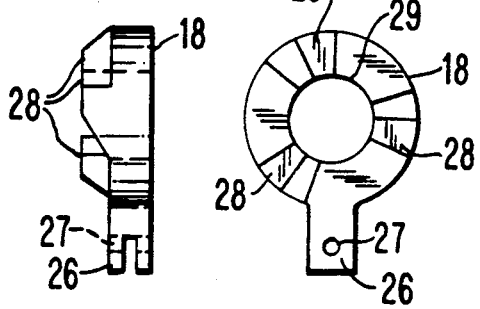
FIGS. 4 and 5 are side and top views respectively of a component of the adjusting mechanism of the device of the invention.
Figure 11:
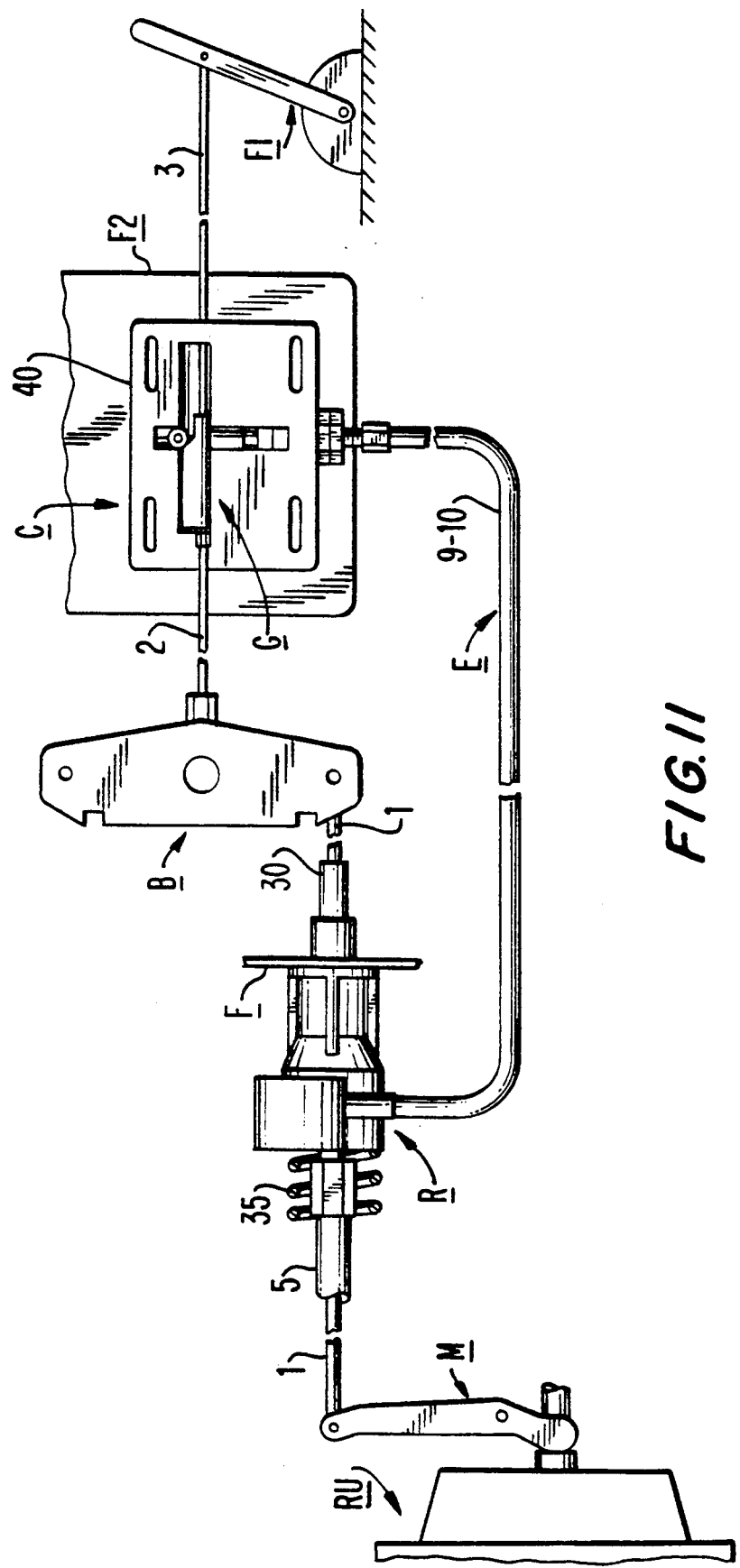
FIG. 11 is an overall view of the device with cooperating parts of a motor vehicle.

FIGS. 4 and 5 show how the thrust disc 18, which is essentially cylindrical, is provided with two retaining projections 26. They allow the firm connection of the corresponding end of the steel cable 10 which, as said above, connects the adjusting mechanism and control mechanism C together, by way of the corresponding through holes 27.

The thrust disc 18 is formed on the surface facing the base member 17 with three radial ribs 28. They mate positionally and dimensionally with the radial slots 24 and sliding planes 25 formed on the said base member 17, so that they may snugly engage together and disengage by means of the said sliding planes.

The thrust disc 18 is also provided with the centered through hole 29 through which the longitudinal centered extension 21 of the base member 17 may slide snugly, as shown in FIGS. 1, 2 and 3 of the drawing sheets.

The spring 19 shown in FIGS. 1 and 2 is disposed coaxially around the steel cable 10 which, stripped of its sheath, is in the interior of the main body member 4 received in the transverse cavity 14. Therefore, with the steel cable 10 being connected to the thrust disc 18 by the retaining projections 26, the spring 19 permanently presses against the thrust disc 18 and against the wall of the transverse cavity 14 through which the steel cable 10 may slide.

The mechanical fixing and adjusting means FR is constituted by the adjusting rod 30, by the jaws 31 provided with the linking spring 32, by the release member 33, by the release spring 34 and by the adjusting spring 35, as shown in detail in FIGS. 1, 2 and 3.

The adjusting rod 30 may slide through the main body member 4, as shown in FIGS. 1, 2 and 3. It is provided with a suitably dimensioned longitudinal bore through which the steel cable 1 linking, as said before, the brake shoe or caliper actuating mechanism of the rear wheel with the rocking device may slide. Said adjusting rod 30 is firmly attached at one end thereof by the terminal 36 to the corresponding end of the sheath 5 of the steel cable 1 the length of which is to be adjusted.

In this embodiment the adjusting rod 30 is formed externally with a screw thread 37 extending along the whole length thereof. Logically, the length of the screw thread 37 may vary depending on each particular application.

The jaws 31, of which there are three in this embodiment, are snugly received, in the frustoconical portion 15 formed in the interior of the main body member 4 as shown in FIGS. 1, 2 and 3. Thereby an essentially cylindrical longitudinal aperture is defined through which the adjusting rod 30 may suitably slide. The respective ends of said aperture form corresponding essentially frustoconical portions 31a and 31b.

The jaws 31 are provided on the surfaces forming the said aperture with corresponding screw threads 38 mating with the retaining screw 37 formed on the adjusting rod 30. They may snugly engage or disengage as shown in the amplified detailed views of FIGS. 3 and 2 respectively.

In this embodiment, the jaws 31 are connected together by the linking spring 32 which is designed to keep the preset distribution of the latter in the frustoconical portion 15 constant while they move therethrough.

The release member 33 and release spring 34 are received, in the cylindrical portion 16 formed in the interior of the main body member 4 as shown in FIGS. 1, 2 and 3.

The release member 33 is essentially cylindrical and is provided with a bore through which the adjusting rod 30 may suitably slide. At the end facing the jaws 31 it is formed with a frustoconical portion 39 mating with the frustoconical 31b formed on the jaws 31.

The release spring 34 is disposed coaxially around the adjusting rod 30 and presses permanently against the wall forming the cylindrical portion 16 of the main body member 4 and against the release body 33. Thereby through the frustoconical portion 39 of the release member 33 it tends to force apart the jaws 31 of the adjusting rod 30, as shown in detail in FIGS. 1, 2 and 3.

FIGS. 1, 2 and 3 show how the spring 35 is disposed coaxially around the sheathed steel cable 1-5 and the adjusting rod 30 and presses permanently against the main body member 4 and, through mechanical means which for reasons similar to those given above are not shown in the drawing sheets, against the sleeve 5 of the steel cable 1. Thereby adjusting the length of the sheathed steel cable 1-5 is adjusted.

The control mechanism is constituted by the main body member 40 which suitably dimensioned may snugly receive the mechanical control means G for the actuation of the adjusting mechanism R depending precisely on the position of the parking brake lever.

The main body member 40 is essentially parallelepipedic as shown in FIGS. 1 and 10 and is made preferably from plastics materials having appropriate mechanical properties. In this embodiment, it is provided with four elongated holes 41 for anchorage thereof to a fixed point F2 on the automobile structure.

FIGS. 1 and 3 show how the main body member 40 is formed in the interior thereof with the longitudinal cavity 42. Both ends are provided with respective bores 43 and 44 through which the steel cables 2 and 3 may respectively suitably slide. It is also provided with the transverse cavity 45, one end of which is provided with the bore 46 provided with a screw thread.

FIGS. 1 and 10 show how the mechanical command means received in the main body member 40 are formed by the thrust member 47, by the draw member 48 and by the adjusting rod 49.

The thrust member 47, which in this embodiment is essentially parallelepipedic in shape, is snugly received in the longitudinal cavity 42 through which it may slide in a sufficient distance. It is attached at one of the longitudinal ends thereof to the steel cable 2 connecting with the rocking device B.

In this embodiment, the thrust member 47 is provided with the sliding surface 50 formed on the end receiving the steel cable 3 which connects with the brake lever.

The draw member 48, which in this embodiment is essentially parallelepipedic in shape is snugly received in the transverse cavity 45 in which it may slide over a sufficient distance. It is attached at one of the ends thereof to the corresponding end of the steel cable 10 which, at the other end thereof, is attached, as said above, to the thrust disc 18 forming the mechanical actuating means MA of the adjusting mechanism R.

The draw member 48 is provided with the bore 51 through which the thrust member may snugly slide. Said draw member 48 is provided with the bearing 52 so that the sliding of thrust member 47 through the draw member 48 causes the latter to move through the transverse cavity 45 as shown in FIG. 1 and 10.

For manual adjustment of the length of the sheathed steel cable E connecting the adjusting mechanism with the control mechanism C the corresponding end of the sheath 9 of the steel cable 10 is firmly attached to the adjusting rod 49 by way of the terminal 53 as shown in FIGS. 1 and 3.

The adjusting rod 49, which is provided with a bore through which the steel cable 10 may suitably slide, is provided on the outer surface thereof over a sufficient length with a screw thread mating with the screw thread provided in the bore 46 of the transverse cavity 45 of the main body member 40. Thereby the adjusting rod 49 may be inserted in the transverse cavity 45 to the distance required by the adjustment of the length of the sheathed cable E in each particular application. The position of the control rod 49 is set once the necessary length of the sheathed cable E has been determined, by the two nuts 54 which are designed to prevent the unscrewing and consequent misadjustment of the adjusting rod 49.

The automobile parking brake cable length self-adjusting device of the invention described here as an embodiment operates as follows:

FIGS. 1 and 2 show the positions occupied by the components of the mechanical means forming the adjusting mechanism and control mechanism C when the parking brake is released, in other words, when the brake lever is in the released position. Under these conditions, the adjusting rod 30 of the mechanical fixing and adjusting means FR may slide freely through the main body member 4 of the adjusting mechanism and may occupy any intermediate adjusting position of the length of the sheathed steel cable 1-5 connecting the corresponding vehicle rear wheel brake shoe or caliper actuating mechanism with the adjusting mechanism . The adjusting position is determined by the mechanisms of the parking brake device and by the action of the adjusting spring 35 of the mechanical fixing and adjusting means FR. Under these conditions, the combined action of the release member 33 and of the release spring 34 of the mechanical fixing and adjusting means and the frustoconical shape 22 of the free end of the longitudinal centered extension 21 of the base member 17 of the actuating mechanism MA,. prevent the jaws 31 from acting on the adjusting rod 30, since said jaws 31, due to the said combined action may slide away from adjusting rod 30 along the frustoconical portion 15 formed on the interior of the main body member 4. This sliding is possible in turn due to the position occupied by the thrust disc 18 of the actuating means MA which is attached by the steel cable 10 to the control mechanism C.

FIGS. 3 and 10 show the positions occupied by the said mechanical means of the adjusting mechanism R and the control mechanism C, respectively, when the parking brake is applied, in other words, when the brake lever is in the braking position. Under these conditions the adjusting rod 30 is blocked due to the action of the jaws 31, and in this way the length of the sheath steel cable 1-5 is fixed. Under these conditions, the thrust disc 18, which is actuated by the steel cable 10, is moved over sufficient distance and moves in turn the jaws 31 across the frustoconical portion 15 of the main body member 4 to the position in which the thread 37 and 38, formed on the adjusting member 30 and the jaws 31 respectively, are blocked together, thereby preventing any movement of the adjusting rod 30.

It will be understood that each of the elements described above, or two or more together, may also find a useful application in other types of constructions differing from the types described above.

While the invention has been illustrated and described as embodied in alength self-regulating device for security cable of motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An automobile parking brake cable length self-adjusting device comprising, an adjusting mechanism which is operative for setting and adjusting a length of a sheathed cable which connects an actuating mechanism of one of a brake shoe and a caliper of one of vehicle rear wheels to a brake level; and a control mechanism which is permanently connectable by the sheathed cable to said adjusting mechanism to cooperate with the latter so that said control mechanism commands setting and adjusting operations of said adjusting mechanism depending on a position of the brake level, said adjusting mechanism being formed as a substantially frustoconical hollow main body member, said main body member of said adjusting mechanism having one end which is arranged to face the actuating mechanism of one of the brake shoe and the caliper and is provided with a concentric radial extension having a tangential extension with a bore of stepped section dimensioned so that the cable devoid of sheath is slidable therethrough, and to receive and fix a corresponding end of the sheath of the cable.

2. An automobile parking brake cable length self-adjusting mechanism is formed as a substantially frustonconical hollow main body member; and further comprising actuating means received in said hollow main body member and connectable to said control mechanism by the cable; and mechanical means setting and adjusting a length of the sheathed cable.

3. An automobile parking brake cable length self-adjusting device as defined in claim 2, wherein said mechanical setting and adjusting means has an adjusting rod which is attachable at one end thereof to a sheath of the cable, said adjusting rod having a longitudinal through bore dimensioned so that the cable, devoid of sheath, is slidable therethrough, said adjusting rod having an external retaining screw thread, said mechanical fixture and adjusting means also having clamping jaws provided with retaining screw threads mating with said thread of said adjusting rod, said mechanical fixing and adjusting means also having a substantially conical release member provided with a bore through which said adjusting rod is slidable.

4. An automobile parking brake cable length self-adjusting device as defined in claim 3, wherein said mechanical fixing and adjusting means has a release spring disposed coaxially with said adjusting rod and pressing permanently against said main body member and said release member, and a spring arranged to be located coaxially above the sheath of the cable and bearing permanently against said main body member of said adjusting mechanism and against the sheath of the cable so that a length of the sheath cable can be adjusted.

5. An automobile parking brake cable length self-adjusting device as defined in claim 1, wherein said main body member of said adjusting mechanism has another end provided with a longitudinal extension which is dimensioned and shaped so as to allow attachment of said adjusting mechanism to a fixed point of a vehicle structure.

6. An automobile parking brake cable length self-adjusting device as defined in claim 5, wherein said main body member has an interior formed at an end facing said actuating mechanism with a cylindrical portion connected to a transverse cavity which is coextensive with said concentric radial extension, said cylindrical portion and said transverse cavity being dimensioned to snugly receive said mechanical actuating means, said main body member also having a frustoconical portion which is an extension of said cylindrical portion and has another cylindrical portion dimensioned to snugly receive said mechanical means.

7. An automobile parking brake cable length self-adjusting device comprising, an adjusting mechanism which is operative for setting and adjusting a length of a sheathed cable which connects an actuating mechanism of one of a brake shoe and a caliper of one of vehicle rear wheels to a brake level; and a control mechanism which is permanently connectable by the sheathed cable to said adjusting mechanism to cooperate with the latter so that said control mechanism commands setting and adjusting operations of said adjusting mechanism depending on a position of the brake lever, said adjusting mechanism being formed as a substantially frustoconical hollow main body member; actuating means received in said hollow main body member and connectable to said control mechanism; and mechanical means setting and adjusting a length of the sheathed cable, said actuating means having a substantially cylindrical base member having a concentric radial extension for coupling and snug closing of an end of said main body member, said base member on each side interior to said main body member being formed with a number of radial slots and with a longitudinal centered extension with a free substantially frustonconical end, said base member having a centered longitudinal bore dimensioned so that said mechanical fixing and adjusting means is slidable therethrough.

8. An automobile parking brake cable length self-adjusting device as defined in claim 7, wherein said mechanical actuating means has an essentially cylindrical thrust disc provided with a longitudinal through bore through which said longitudinal center extension of said base member is slidable, said thrust disc having a surface which faces said base member and is provided with radial ribs in a number and size corresponding to the number and size of said radial slots of said base member so that they are snugly engageable and disengageable, said thrust disc being provided with retaining projections for firm attachment with the cable.

9. An automobile parking brake cable length self-adjusting device as defined in claim 8, wherein said main body member has a transverse cavity, the mechanical actuating means further having a spring which is located in said transverse cavity, permanently bears against said thrust disc and against a wall of said cavity so that when said spring is expanded it establishes a position in which said thrust disc and said base member are closest together.

10. An automobile parking brake cable length self-adjusting device comprising, an adjusting mechanism which is operative for setting and adjusting an length of a sheathed cable which connects an actuating mechanism of one of a brake shoe and a caliper of one of vehicle rear wheels to a brake lever; and a control mechanism which is permanently connectable by the sheathed cable to said adjusting mechanism to cooperate with the latter so that said control mechanism commands setting and adjusting operations of said adjusting mechanism depending on a position of the brake lever, said adjusting mechanism being formed as a substantially frustoconical hollow main body member; actuating means received in said hollow main body member and connectable to said control mechanism; mechanical means setting and adjusting a length of the sheathed cable; and mechanical command means determining the actuating of said adjusting mechanism, said control mechanism having a substantially right parallelepipedic main body member dimensioned to snugly receive said mechanical command means.

11. An automobile parking brake cable length self-adjusting device as defined in claim 10, wherein said mechanical means has a plurality of members, said control mechanism having a main body with means for anchoring said main body to a fixed point of a vehicle structure and formed with a longitudinal through cavity and a transverse cavity dimensioned so that said member of said command means are slidable snugly therethrough while acting coordinatedly, said transverse cavity being provided with a through hole.

12. An automobile parking brake cable length self-adjusting device as defined in claim 11, wherein said through hole of said transverse cavity is formed with a retaining screw thread.

13. An automobile parking brake cable length self-adjusting device as defined in claim 11, wherein said mechanical command means has a thrust member which is received in said longitudinal through cavity and attached to the table, a draw member which is located ins aid transverse cavity and attachable to a corresponding end of the cable connecting it to said thrust disc of said adjusting mechanism, said draw member having a through hole through which said thrust member of said mechanical command means is slidable causing a longitudinal movement of said draw member over a distance, and an adjusting rod which is attachable at one end thereof to the sheath of the cable, is provided with a longitudinal through hole so that the cable devoid of sheath connected to said draw member is slidable therethrough, allowing for adjustment and setting of the length of the cable.

14. An automobile parking brake cable length self-adjusting device as defined in claim 13, wherein said adjusting rod of said mechanical command means is formed on its outside with a retaining screw thread.

* * * * *